US011689000B2

(12) United States Patent
Thielmann et al.

(10) Patent No.: US 11,689,000 B2
(45) Date of Patent: Jun. 27, 2023

(54) SWITCHGEAR CABINET HAVING AT LEAST ONE BRUSH STRIP FOR THE CONDUCTOR FEEDTHROUGH

(71) Applicant: RITTAL GMBH & CO. KG, Herborn (DE)

(72) Inventors: Bodo Thielmann, Siegbach (DE); Ahmet Savasci, Dillenburg (DE)

(73) Assignee: RITTAL GMBH & CO. KG, Herborn (DE)

( * ) Notice: Subject to any disclaimer, the term of this patent is extended or adjusted under 35 U.S.C. 154(b) by 23 days.

(21) Appl. No.: 17/290,039

(22) PCT Filed: Jan. 16, 2020

(86) PCT No.: PCT/DE2020/100028
§ 371 (c)(1),
(2) Date: Apr. 29, 2021

(87) PCT Pub. No.: WO2020/169142
PCT Pub. Date: Aug. 27, 2020

(65) Prior Publication Data
US 2021/0408770 A1    Dec. 30, 2021

(30) Foreign Application Priority Data
Feb. 19, 2019    (DE) ............... 10 2019 104 151.1

(51) Int. Cl.
*H02B 1/30*    (2006.01)
*H02B 1/01*    (2006.01)

(52) U.S. Cl.
CPC ............. *H02B 1/305* (2013.01); *H02B 1/012* (2013.01)

(58) Field of Classification Search
CPC ................................ H02B 1/012; H02B 1/305
See application file for complete search history.

(56) References Cited

U.S. PATENT DOCUMENTS

| | | | |
|---|---|---|---|
| 7,033,267 B2 * | 4/2006 | Rasmussen | H05K 7/20572 361/691 |
| 7,507,912 B1 * | 3/2009 | Sempliner | H02G 3/185 174/152 G |
| 9,648,784 B2 * | 5/2017 | Keisling | H05K 7/20218 |

(Continued)

FOREIGN PATENT DOCUMENTS

| | | | |
|---|---|---|---|
| DE | 4410795 C1 * | 9/1995 | ........... G02B 6/4441 |
| DE | 10210754 A1 | 10/2003 | |

(Continued)

OTHER PUBLICATIONS

International Search Report (in English and German) and Written Opinion of the ISA (in German) issued in PCT/DE2020/100028, dated Mar. 4, 2020; ISA/EP.

(Continued)

*Primary Examiner* — Robert J Hoffberg
(74) *Attorney, Agent, or Firm* — Harness, Dickey & Pierce, P.L.C.

(57) ABSTRACT

A switch cabinet with at least one brush strip for the conductor feed-through, the switch cabinet having a switch cabinet frame with a horizontal or vertical profile frame from which a profile web extends, wherein the brush strip is placed on a free end of the profile web with bristles extending from the profile web over the inner portion of the profile frame.

10 Claims, 3 Drawing Sheets

(56) References Cited

U.S. PATENT DOCUMENTS

Figure 1:
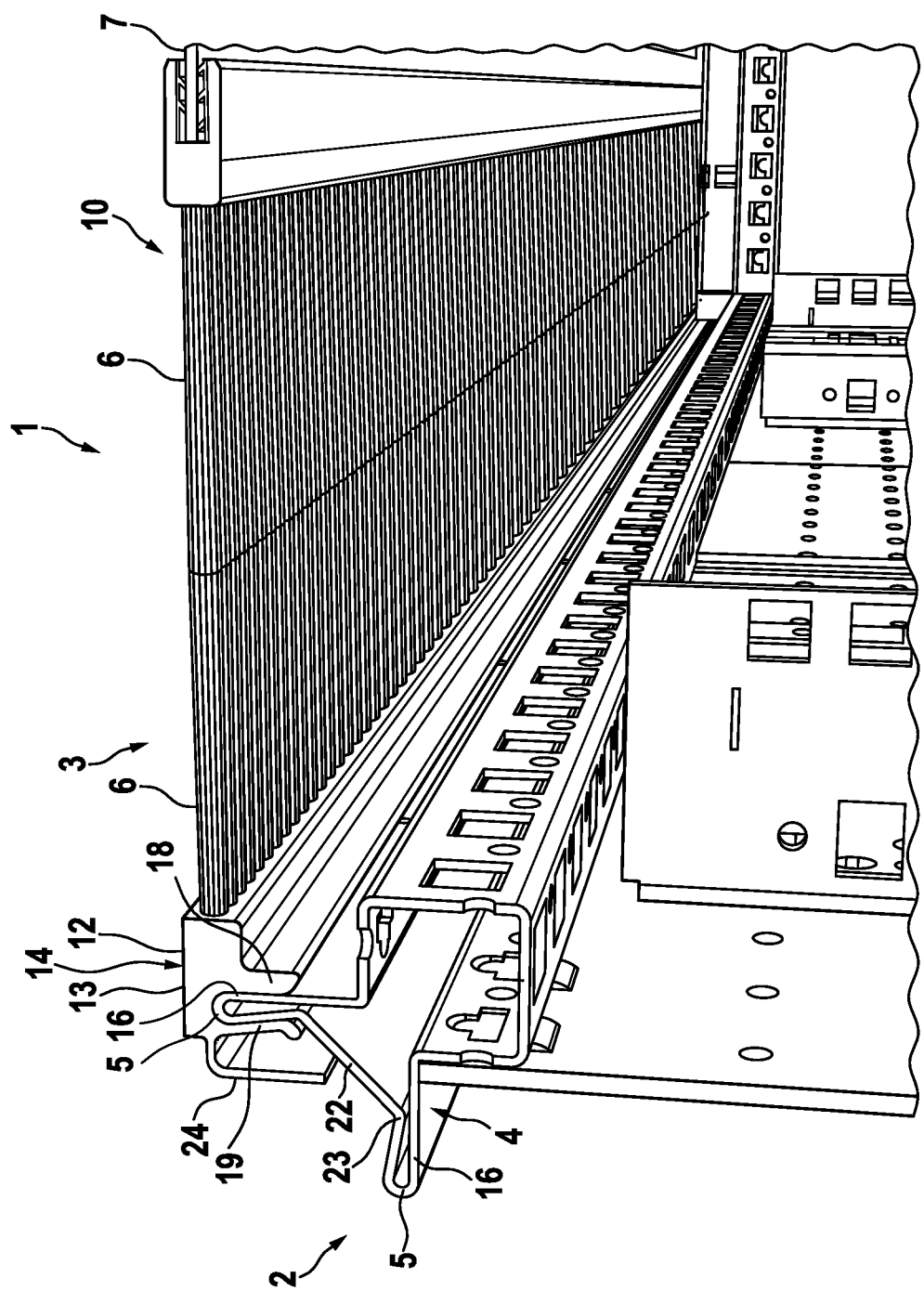

| | | | | |
|---|---|---|---|---|
| 9,871,353 B2* | 1/2018 | Boehme | ............... | H02B 1/014 |
| 9,888,608 B2* | 2/2018 | Pons | ............... | H05K 7/18 |
| 10,021,804 B1* | 7/2018 | Gray | ............... | H05K 7/1491 |
| 10,030,689 B2 | 7/2018 | Thielmann et al. | | |
| 10,396,531 B2* | 8/2019 | Reuter | ............... | H02B 1/013 |
| 10,448,539 B2* | 10/2019 | Keisling | ............... | H05K 7/2079 |
| 10,663,090 B2* | 5/2020 | Paetow | ............... | F16L 5/04 |
| 2022/0087047 A1* | 3/2022 | Fan | ............... | A47B 96/1466 |

FOREIGN PATENT DOCUMENTS

| | | | | |
|---|---|---|---|---|
| DE | 102015121192 A1 | 6/2017 | | |
| DE | 202017002614 U1 | 10/2017 | | |
| FR | 2701607 A1 | 8/1994 | | |
| KR | 20150001167 U * | 3/2015 | ............ | H05K 5/0221 |

OTHER PUBLICATIONS

German International Preliminary Report on Patentability issued in PCT/DE2020/100028, dated Feb. 8, 2021; ISA/EP.

* cited by examiner

SWITCHGEAR CABINET HAVING AT LEAST ONE BRUSH STRIP FOR THE CONDUCTOR FEEDTHROUGH

CROSS-REFERENCE TO RELATED APPLICATIONS

This application is a 371 U.S. National Phase of International Application No. PCT/DE2020/100028, filed on Jan. 16, 2020, which claims the benefit of German Application No. 10 2019 104 151.1, filed on Feb. 19, 2019. The entire disclosures of the above applications are incorporated herein by reference.

BACKGROUND

This section provides background information related to the present disclosure which is not necessarily prior art.

TECHNICAL FIELD

The invention is based on a switch cabinet with at least one brush strip for the conductor feed-through, wherein the switch cabinet has a switch cabinet frame with a horizontal or vertical profile frame from which a profile web extends. Such a switch cabinet is known from DE 10 2015 121 192 A1.

Discussion

For the introduction of conductors, for example electric cables or other supply lines into the interior of the switch cabinet, it is known to use brush strips which are fixed to the frame rack of the switch cabinet by means of cage nuts or the like via the system perforation of the frame rack. The assembly of the brush strips is thus usually tool-bound and correspondingly time-consuming.

SUMMARY

This section provides a general summary of the disclosure, and is not a comprehensive disclosure of its full scope or all of its features.

It is therefore one aspect of the invention to further develop a switch cabinet of the type described above in such a way that it permits simple and, in particular, tool-free mounting of the brush strip on the frame of the switch cabinet.

Accordingly, it is provided that the brush strip is placed on a free end of the profile web with bristles extending from the profile web over the inner circumference of the profile frame. The invention thus makes use of the profile web present on the profile frame of the framework, which, for example in the framework known from DE 10 2015 121 192 A1, can be a sealing web with the aid of which a flat part fixed to the framework can be sealed with respect to the framework—if necessary with the aid of an additional sealing element.

At least one wall or roof plate can be mounted on the horizontal or vertical profile frame, which partially closes the profile frame and has a free edge that extends parallel to the brush strip and abuts a free bristle joint edge of the brush strip. In this case, the wall or roof plate can have a further brush strip complementary to the brush strip, in particular opposite, the free bristle ends of which form the free edge of the wall or roof plate.

The brush strip can have an adapter with a plug-in receptacle, via which the brush strip is plugged onto the profile web, wherein bristles of the brush strip extending parallel to one another are formed in one piece with the adapter.

The adapter can have a contact surface for a flat part of the switch cabinet on its outer side facing away from the profile web. The profile web can be a circumferential sealing web of the profile frame and the contact surface of the adapter can be a sealing surface against which the flat part rests with a contact pressure. In this case, the adapter can be at least partially and preferably completely made of a sealing material, by which the bristles of the brush strip are held via their end facing away from the free ends of the bristles.

The profile web can widen towards its free end, via which the brush strip is placed on the profile web via its adapter. In this case, the receptacle can be undercut. The plug-in receptacle can be made of an elastic material, so that the profile web is received in the plug-in receptacle in a substantially form-fitting manner.

The profile web can have a vertical or horizontal profile side on the inner circumference of the profile frame and a further profile side at an acute angle to the outer circumference of the profile frame. The plug-in receptacle can have a stop which rests against the vertical or horizontal profile side.

The plug-in receptacle can be delimited opposite the stop by a clamping section which can be displaced in relation to the stop against a mechanical pretension between a release position, in which the adapter is released from the profile web, and a clamping position, in which the clamping section rests against the profile web and is pressed on with the pretension.

At least the plug-in receptacle of the adapter can be formed in one piece and entirely from the same plastic material, for example from an elastomer or a soft plastic. In this case, the stop can have a material thickness that is at least 30% greater than the clamping section. Preferably, the stop has a material thickness at least 50% greater than the clamping section.

The clamping section can have a bend at its free end, at which the clamping section merges into an end section, along which the clamping section rests against a run-off slope on the outer circumference of the profile frame, into which the profile web merges.

The profile frame may be a roof frame of the enclosure, in which the free end of the profile web onto which the brush strip is fitted forms a horizontal circumferential sealing edge of the roof frame. The roof frame may have a drainage slope on an outer circumference of the sealing bar adjacent to the sealing bar, which drainage slope opens into a horizontal rain gutter of the roof frame.

The brush strip, preferably an adapter of the brush strip, may have a deflector on its side facing the rain gutter extending from an upper end of the brush strip, preferably from an upper end of the adapter, towards the drain slope. The deflector can be formed as a sealing lip which is fixed at the upper end of the brush strip and preferably at the upper end of the adapter and extends at a distance from the adapter towards the drain slope.

The brush strip can have a sealing edge at its end face, against which a sheet edge of a wall or roof plate can be brought into sealing contact.

The switch cabinet may have a wall or roof plate with an aperture which is aligned with bristles of the brush strip or in which the bristles of the brush strip are arranged, the brush strip being arranged between the wall or roof plate and the profile frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
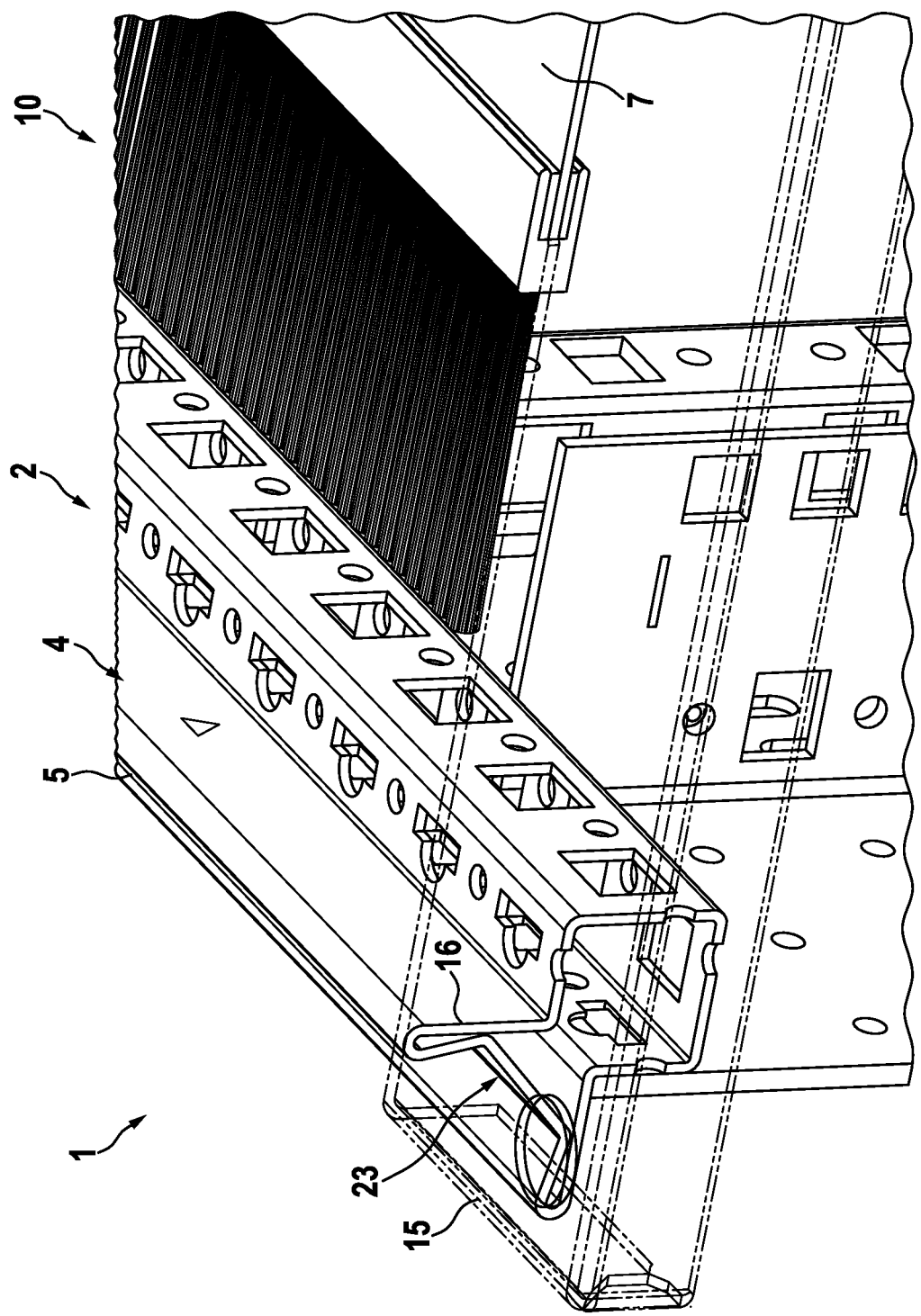
Figure 3:
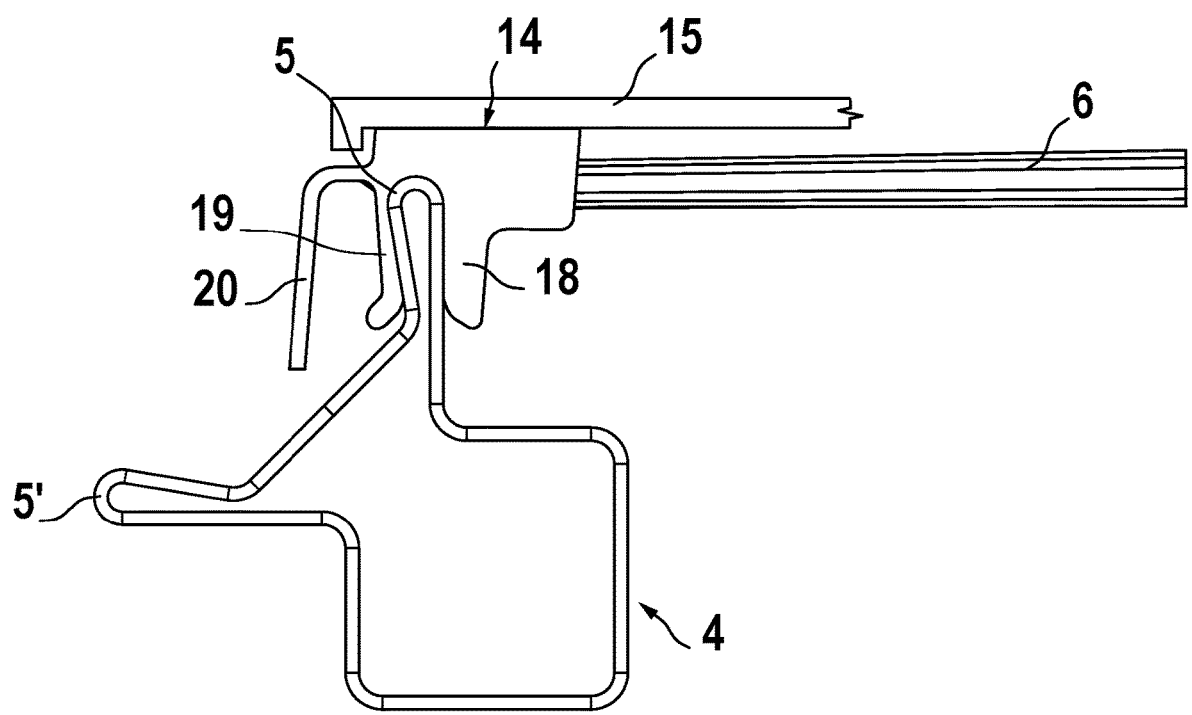

Further details of the invention are explained with reference to the figures below. Thereby shows:

FIG. 1 a first embodiment of a switch cabinet according to the invention in a perspective view of a vertical section;

FIG. 2 the embodiment according to FIG. 1 with the flat roof panel indicated; and FIG. 3 is an enlarged partial view showing the flat roof panel secured to the adapter.

DETAILED DESCRIPTION

Example embodiments will now be described more fully with reference to the accompanying drawings.

FIG. 1 shows an exemplary embodiment of a switch cabinet 1, in which the frame 2 and in particular the cross-section of the profile struts of the frame 2 has a geometry as known from DE 10 2015 121 192 A1. The framework 2 is characterised in that profile webs 5 and 5' extend from the horizontal and vertical profile frames 4 of the framework 2 and are undercut, i.e. widen towards their free end.

The profile webs 5 and 5' are sealing webs which extend from the outer side of the respective profile frame 4 facing away from the switch cabinet 1 and can, for example, form a circumferentially closed profile web frame. The circumferentially closed profile web frame can be used to seal a flat part 15 (discussed later herein) with respect to the respective profile frame 4, if necessary with the aid of a sealing element which is applied, for example, to an inner side of the flat part 15 and into which the profile web 5' presses via its free end, in order to seal the framework 2 with respect to the flat part.

According to the invention, the profile web 5 is now assigned a second function in that it is used to hold a brush strip 3, which is attached to the free end of the profile web 5. Bristles 6 extend from the brush strip 3 over the inner portion of the profile frame 4. In this case, the profile frame 4 is a roof frame of the switch cabinet frame 2, which is partially closed by a roof plate 7. A complementary brush strip 10 is attached to a free longitudinal edge of the roof plate 7 so that the two brush strips 3, 10 abut each other via the free ends of their bristles and thus provide effective protection against dust and the penetration of other light objects into the interior of the switch cabinet. Although the two brush strips 3, 10 are arranged "butt to butt", this may include, as is generally known in the prior art, the bristles of the opposing brush strips 3, 10 at least partially interlocking or overlapping.

The brush strip 3 has an adapter 12 with a plug-in receptacle 13, via which the brush strip 3 is plugged onto the profile web 5, which is designed as an undercut sealing web. The adapter 12 can, for example, be made of an elastomer or a soft plastic in one piece with the bristles 6 of the brush strip 3. In particular, the bristles 6 may be moulded into the adapter 12. On the upper side, the adapter 12 has a contact surface 14 for a flat part 15 such as a flat roof panel (see FIG. 2 and FIG. 3). The contact surface 14 can in particular be a sealing surface, for which purpose the contact surface 14 and preferably the entire adapter 12 is made of a corresponding sealing material, for example an elastomer, so that when the flat part rests on the contact surface 14 and a suitable contact pressure of the flat part on the contact surface 14 is provided, the flat part 15 is effectively sealed with respect to the profile frame 4. The contact pressure can be provided, for example, by means of common flat part holders for mounting flat parts on switch cabinet frame racks.

The adapter 12 has a plug-in receptacle 13 by means of which the adapter 12 is plugged onto the profile web 5. The plug-in receptacle 13 is formed as an undercut groove which extends in the longitudinal direction of the adapter and thus in the longitudinal direction of the brush strip 3. In order to achieve a defined positioning of the brush strip 3 in relation to the profile frame 4 when the brush strip is plugged onto the profile frame 4, in particular onto the profile web 5, it is provided that the plug-in receptacle has a stop 18 which abuts against a vertical profile side 16 directed towards the inner portion of the profile frame 4. Opposite the stop 18, the plug-in receptacle 13 has a clamping section 19 which, together with the stop 18, delimits the plug-in receptacle 13.

The clamping section 19 can be displaced relative to the stop 18 against a mechanical pre-tension between a release position, in which the adapter 12 is released from the profile web 5, and a clamping position, in which the clamping section 19 rests against the profile web 5 and is pressed against with the pre-tension. In this case, the secure and defined pre-positioning of the brush strip 3 in relation to the profile web 5 is achieved by the fact that the plug-in receptacle 13 of the adapter 12 is formed in one piece and entirely from the same plastic material and the stop 18 has a greater material thickness than the clamping section 19. Preferably, the thickness of the stop 18 is at least 30% greater than the thickness of the clamping section 19. This ensures that when the brush strip 3 is pressed onto the profile web 5, the mechanical pretension of the plug-in receptacle 13 is absorbed by the clamping section 19, in that the clamping section 19 undergoes elastic deformation, while the stop 18 remains essentially undeformed. The pre-tension acting perpendicularly to the stop 18 in turn causes the stop 18 to be pressed against the vertical profile side 16 on the inner circumference of the profile frame 4, whereby the brush strip 3 assumes a defined position with respect to the profile frame 4.

On its side extending along the outer direction of the profile frame 4, the adapter 12 has a deflector 24 which extends from an upper end of the brush strip 3, in the present case adjacent to the clamping section 19 and formed integrally therewith, towards the run-off slope 22 of the profile frame 4. The profile frame 4, which is designed as a horizontal roof frame, has a drainage slope 22 on its outer circumference adjacent to the profile web 5', which drainage slope 22 opens into a horizontal rain gutter 23 of the roof frame.

The synopsis of FIGS. 1-3 shows that the arrangement of the brush strip 3 on the profile frame 4 according to the invention makes it possible to effectively seal a flat part 15, for example in this case a roof panel of the enclosure 1, with respect to the frame 2. As has already been described with reference to FIG. 1, the brush strip 3 can be made of an elastic sealing material in the region of its adapter 12, so that a seal of the flat part 15 with respect to the profile frame 4 is achieved when the flat part 15 is pressed against the profile frame 4 via the contact surface 14 of the adapter 12.

The features of the invention disclosed in the foregoing description, in the drawings as well as in the claims may be essential for the realisation of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch cabinet comprising:
a plurality of horizontal and vertical profile frames defining an exterior boundary of the switch cabinet, at least one horizontal or vertical frame of the horizontal or vertical profile frames having an exteriorly extending profile web;
a first brush strip for feed-through of conductors;
the first brush strip including an adapter, the adapter having a plug in receptacle, the plug in receptacle being plugged on to a free end of the exteriorly extending profile web;
the adapter holding the first brush strip over an inner portion of the switch cabinet, the adapter presenting a flat sealing surface; and
a flat roof panel secured to the flat sealing surface of the adapter.

2. The switch cabinet according to claim 1, further comprising a plate mounted on at least another horizontal or vertical frame of the horizontal or vertical profile frames, opposite the first brush strip, which the plate has a second brush strip that partially closes the inner portion of the switch cabinet, the second brush strip having a free edge which extends parallel to the first brush strip and butts against a free bristle butt edge of bristles of the first brush strip.

3. The switch cabinet according to claim 1 wherein bristles of the first brush strip, which extend parallel to one another, are formed integrally with the adapter.

4. The switch cabinet according to claim 3, in which the adapter is formed at least partially from a sealing material, by which ends of the bristles of the first brush strip are held.

5. The switch cabinet according to claim 3, in which the exteriorly extending profile web has a first vertical profile side facing an interior of the switch cabinet, and a second vertical profile side facing an exterior of the switch cabinet, the adapter having a stop which bears against the first or second vertical profile side.

6. The switch cabinet according to claim 5, wherein the adapter further comprises:
a clamping section that is pretensioned against a side of the exteriorly extending profile web opposite the stop.

7. The switch cabinet according to claim 6, in which the adapter is formed in one piece from an elastomer or a soft plastic, wherein the stop has a material thickness which is at least 30% greater than the clamping section.

8. The switch cabinet according to claim 6, in which the clamping section has a bend at a free end of the clamping section, and wherein the exteriorly extending profile web has a run off sloping section extending exteriorly of the switch cabinet, and wherein the bend of the clamping section rests against the run off sloping section of the exteriorly extending profile web.

9. The switch cabinet according to claim 1, in which the at least one horizontal or vertical frame is a roof frame of the switch cabinet, the roof frame having a drainage slope and a horizontal gutter, the drainage slope opening into the horizontal gutter, and wherein on a side of the adapter that faces the horizontal gutter, a deflector of the adapter extends towards the drainage slope.

10. A switch cabinet comprising:
a profile frame defining an upper exterior boundary of the switch cabinet, the profile frame having an upwardly extending web section, a lower part of the upwardly extending web section blending into a downwardly sloping section which terminates in a horizontal gutter;
a horizontally extending brush strip having an adapter and a plurality of horizontally extending bristles connected to an interiorly facing, downwardly extending side of the adapter, the adapter including:
an upper horizontal sealing surface,
an undercut section that mates with the upwardly extending web section of the profile frame to plug onto the adapter the profile frame,
a downwardly extending stop section engaging an interior side of the upwardly extending web section of the profile frame, and
a downwardly extending clamping section pressing against an exteriorly facing side of the upwardly extending web section;
and
a flat roof plate having an end portion secured to the upper horizontal sealing surface of the adapter.

* * * * *